(12) United States Patent
Greenberger

(10) Patent No.: US 7,284,082 B2
(45) Date of Patent: Oct. 16, 2007

(54) CONTROLLER APPARATUS AND METHOD FOR IMPROVED DATA TRANSFER

(75) Inventor: Alan J. Greenberger, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 208 days.

(21) Appl. No.: 10/921,723

(22) Filed: Aug. 19, 2004

(65) Prior Publication Data

US 2006/0041702 A1    Feb. 23, 2006

(51) Int. Cl.
*G06F 13/36* (2006.01)
(52) U.S. Cl. ...................... 710/312; 710/316
(58) Field of Classification Search ............... 710/312, 710/316
See application file for complete search history.

(56) References Cited

U.S. PATENT DOCUMENTS

| | | | | |
|---|---|---|---|---|
| 4,991,084 A | * | 2/1991 | Rodiger et al. | 710/316 |
| 5,537,592 A | * | 7/1996 | King et al. | 707/200 |
| 5,668,956 A | * | 9/1997 | Okazawa et al. | 710/306 |
| 5,799,161 A | * | 8/1998 | Merrick | 710/305 |
| 5,859,988 A | * | 1/1999 | Ajanovic et al. | 710/306 |
| 5,889,935 A | * | 3/1999 | Ofek et al. | 714/6 |
| 6,052,752 A | * | 4/2000 | Kwon | 710/306 |
| 6,081,863 A | * | 6/2000 | Kelley et al. | 710/312 |
| 6,175,888 B1 | * | 1/2001 | Guthrie et al. | 710/310 |
| 6,633,296 B1 | * | 10/2003 | Laksono et al. | 345/502 |
| 6,675,251 B1 | * | 1/2004 | Streitenberger et al. | 710/306 |
| 6,763,416 B1 | * | 7/2004 | LaBerge | 710/305 |
| 6,792,486 B1 | * | 9/2004 | Hanan et al. | 710/74 |
| 6,954,811 B2 | * | 10/2005 | Vishnu | 710/113 |
| 2002/0049890 A1 | * | 4/2002 | Bosisio et al. | 711/146 |
| 2002/0156887 A1 | * | 10/2002 | Hashimoto | 709/224 |
| 2004/0100980 A1 | * | 5/2004 | Jacobs et al. | 370/412 |

FOREIGN PATENT DOCUMENTS

| | | | |
|---|---|---|---|
| JP | 60110067 A | * | 6/1985 |
| JP | 03040122 A | * | 2/1991 |

OTHER PUBLICATIONS

Dictionary of Computers, Information Processing & Telecommunications 1984, Second edition pp. 155, 370, 376.*

* cited by examiner

*Primary Examiner*—Paul R. Myers

(57) ABSTRACT

Embodiments of the invention include a controller apparatus, system and method for transferring data between data storage devices within a computer system. The inventive controller apparatus includes device interface logic for connecting the controller to a plurality of data storage devices, e.g., a hard disk device and a CD-RW device, and host interface logic for connecting the controller to a host or host computer via a bus such as a PCI bus. The host includes a number of other components, e.g., a host memory, connected thereto. The controller includes switching circuitry that allows data to be transferred directly from the source data storage device to at least one destination data storage device, i.e., without the transferred data passing from the controller through the bus to the host and/or the host memory. The switching circuitry includes the appropriate buffering circuitry and multiplexing circuitry to transfer data directly from the source device to the destination device in a manner that relieves the host, the host memory, and the bus between the host and the controller of much of the data transfer responsibilities during most data transfer operations. Also, inventive controller reduces the time required for data transfer and allows the data transfer components to dissipate less power. According to alternative embodiments of the invention, the enhanced controller also includes data verification logic for verifying the integrity of the data transfer.

24 Claims, 7 Drawing Sheets

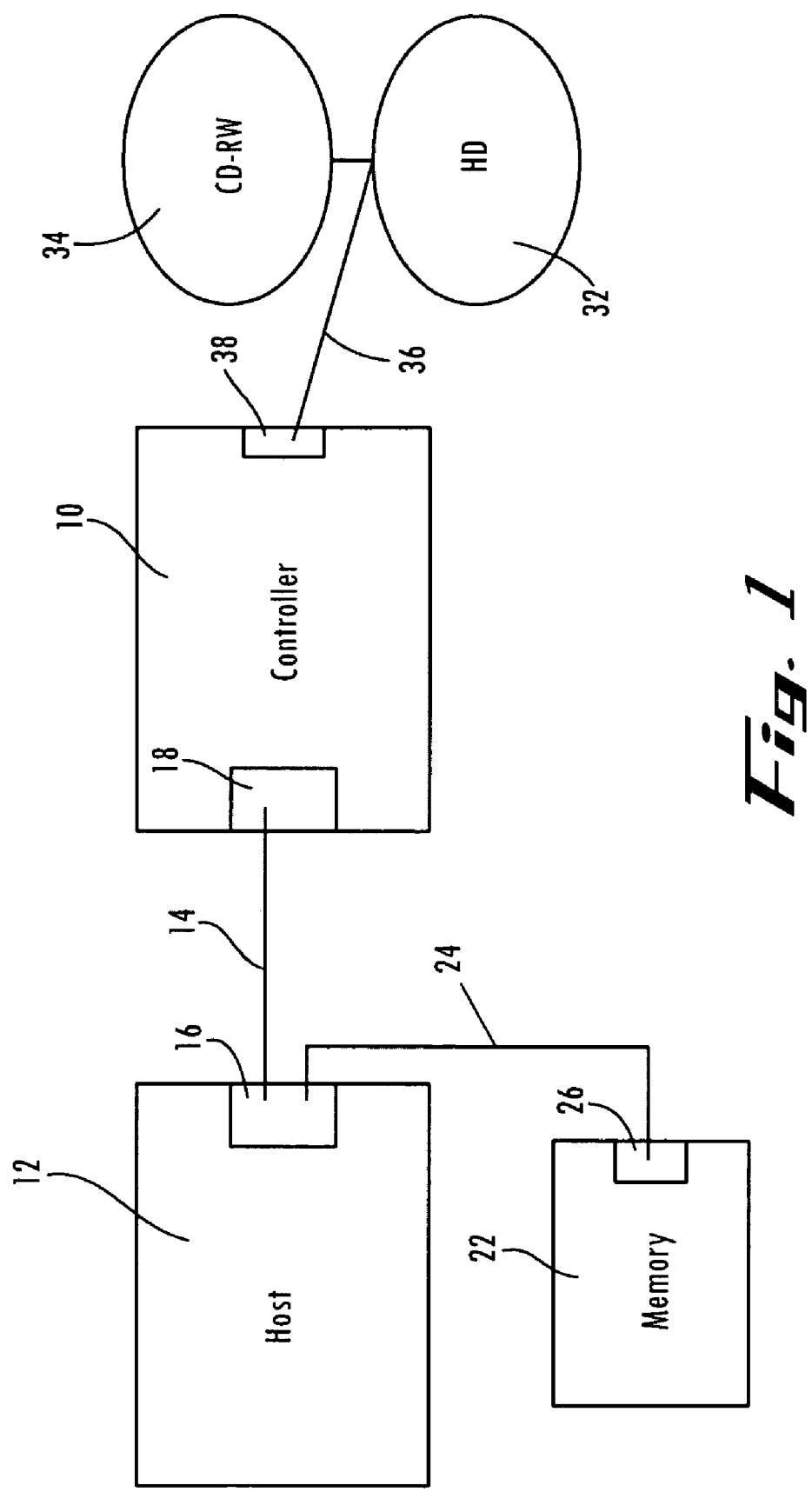

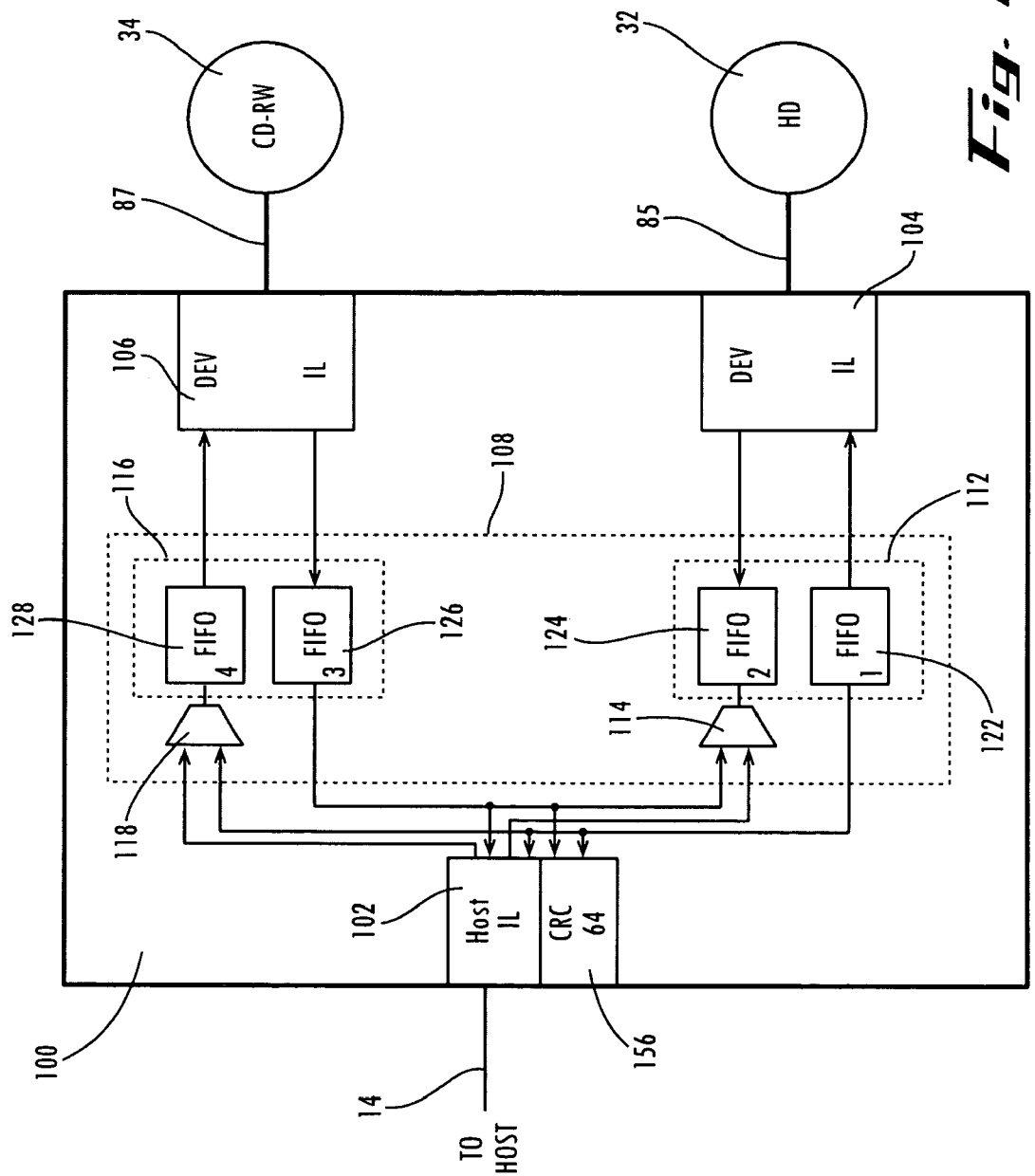

CONTROLLER APPARATUS AND METHOD FOR IMPROVED DATA TRANSFER

BACKGROUND OF THE INVENTION

1. Field of the Invention

The invention relates to controllers such as Serial ATA (SATA) host controllers. More particularly, the invention relates to enhanced controllers that reduce data transfer tasks of the host and the host memory to reduce the amount of data transfer on the interface between the host and the controller.

2. Description of the Related Art

Within the world of computers and computer architecture, data storage devices and their interfaces have become more sophisticated in their manufacture and operation, thus resulting in increased rates of data transfer and storage. The rate at which data is transferred between devices such as computer hard disks and drives such as Compact Disc Read/Write (CD-RW) drives is increasing proportionately greater than the increase in cycle time (clock speed) of the memory of the host computer. For example, data storage devices using the disk drive interface standard known as Advanced Technology Attachment (ATA), also known as Integrated Drive Electronics (IDE), currently have transfer rates of at least 2.4 Gigabits per second (Gb/s). The ATA standard, which has evolved into the standard known as Serial ATA (SATA or S-ATA), is characterized by the integration of the device controller on the device itself.

Data transfer between devices typically involves the transfer of data from a first device to the host memory, and then the transfer of data from the host memory to a second device. Data storage devices connect to the host computer by interfacing with a controller, e.g., a host controller, usually via an interface cable such as an IDE cable. The controller, e.g., an ATA controller or an SATA controller, interfaces with the host computer and its memory via a bus, e.g., a PCI bus or a PCI Express bus. A PCI bus is an interface bus manufactured and operated according to the Peripheral Component Interconnect (PCI) bus standard.

Accessing data from data storage devices at the relatively high data transfer rates mentioned above puts a load on the host, the host memory, and the bus connecting the host to the controller. Moreover, other devices and their interfaces, e.g., Universal Serial Bus (USB) and Firewire interfaces, compete for data transfer time on the bus connected to the host and the host memory.

Accordingly, it would be desirable to have an improved controller apparatus and method that reduce the use of the host, the host memory and the bus between the host and the controller during data transfer operations by offloading tasks conventionally required of the host, the host memory and the bus between the host and the controller.

SUMMARY OF THE INVENTION

The invention is embodied in an enhanced controller apparatus, system and method for transferring data between data storage devices within a computer system. The enhanced controller apparatus includes device interface logic for connecting the controller to a plurality of data storage devices, e.g., a hard disk device and a CD-RW device, and host interface logic for connecting the controller to a host or host computer via a bus such as a PCI bus. The host includes a number of other components, e.g., a host memory, connected thereto. In conventional data transfers between data storage devices, data from the source device is read by the controller and transferred from the controller through the bus to the host and/or the host memory device. Then, the data is transferred from the host memory device and/or the host to the controller through the bus, and then is written from the controller to the destination device. Thus, in conventional data transfers, data is transferred several times across the bus between the host and the controller, and temporarily occupies the computing resources of the host and the storage resources of the host memory. According to embodiments of the invention, the controller includes switching circuitry that allows data to be transferred directly from the source data storage device to at least one destination data storage device, i.e., without the transferred data passing from the controller through the bus to the host and/or the host memory. The switching circuitry includes the appropriate buffering circuitry and multiplexing circuitry to transfer data directly from the source device, via the source device interface and the source device interface logic, to the destination device, via the destination device interface logic and the destination device interface. The multiplexing circuitry allows the buffering circuitry to accept data from a data storage device or, in a conventional manner, from the host bus. According to alternative embodiments of the invention, the enhanced controller also includes data verification logic for verifying the integrity of the data transfer. According to embodiments of the invention, the enhanced controller relieves the host, the host memory, and the bus between the host and the controller of much of the data transfer responsibilities during most data transfer operations. Also, according to embodiments of the invention, the time required for data transfer is reduced and the data transfer components dissipate less power.

BRIEF DESCRIPTION OF THE DRAWINGS

FIG. 6 is a simplified schematic diagram of a controller such as a SATA host controller with data verification logic incorporated therein, according to an alternative embodiment of the invention; and FIG. 7 is a simplified schematic diagram of a plurality of controllers such as SATA host controllers interfaced with a host via a bus switch such as a PCI switch, according to an alternative embodiment of the invention.

DETAILED DESCRIPTION OF EXEMPLARY EMBODIMENTS

Figure 2:
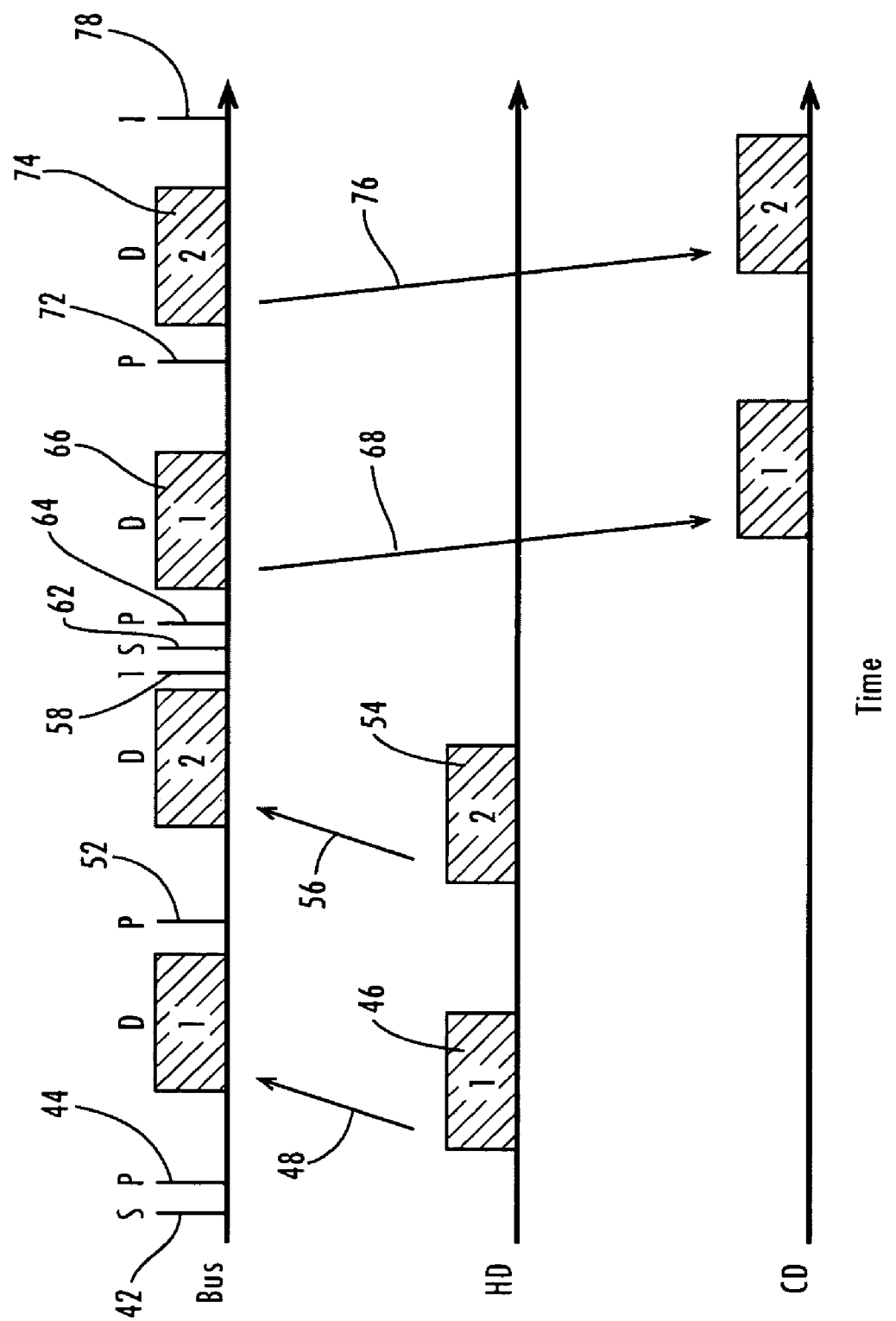
FIG. 2 is a simplified diagram of the bus utilization of a conventional controller, as a function of time, during a copy operation between two external devices.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 1:
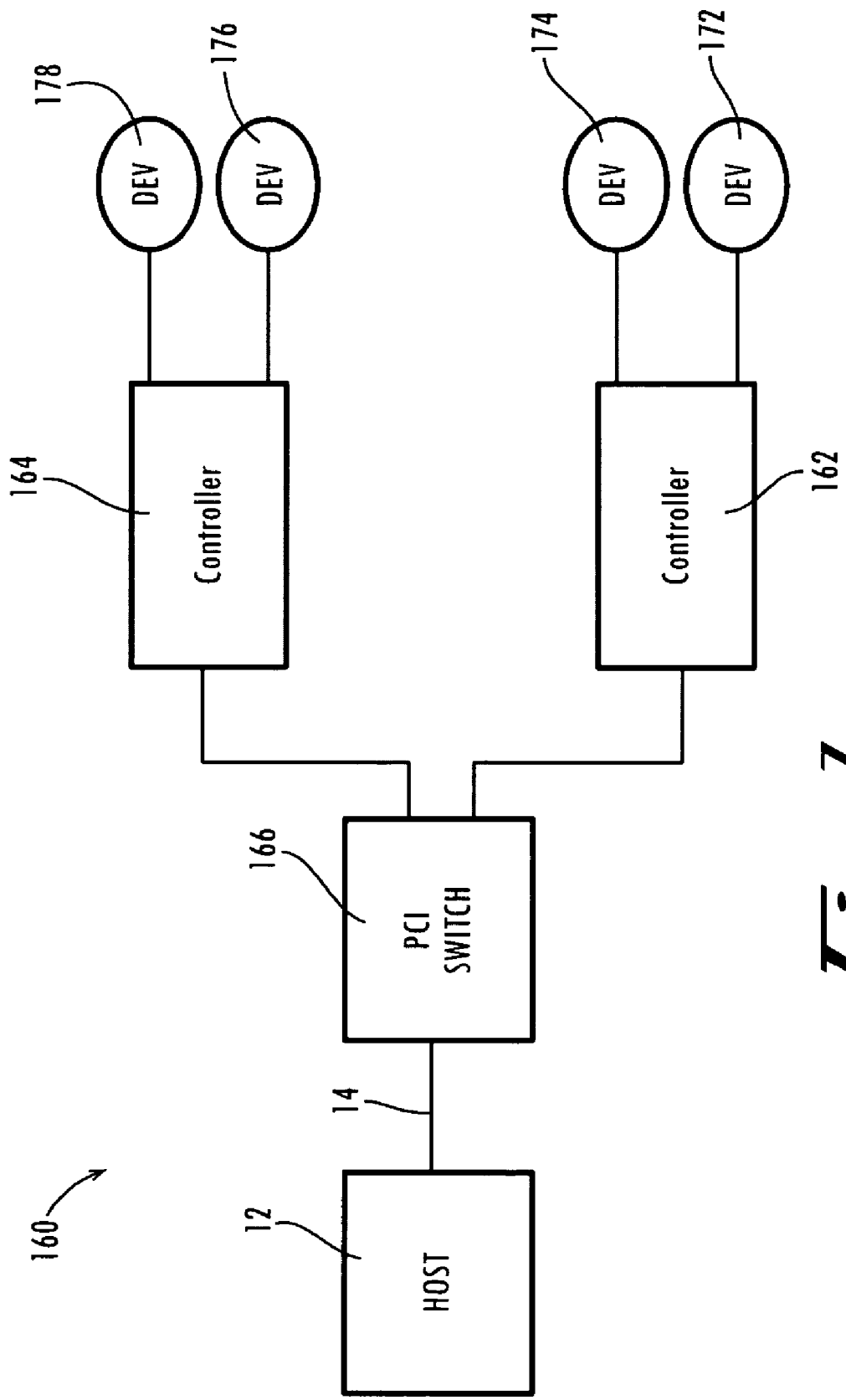
FIG. 1 is a simplified schematic diagram of a conventional ATA host controller interfaced between a bus such as a PCI bus and a plurality of data storage devices.

Referring now to FIG. 1, shown is a simplified schematic diagram of a conventional mass storage controller 10 such as a host controller (HC). Conventionally, the controller 10, which also is known as a Host Bus Adapter (HBA), is physically located on a computer circuit board that is plugged into a PCI slot on the motherboard. Alternatively, the controller 10 or a portion of the controller 10 is fabricated as an integrated circuit (IC), or the controller 10 is integrated onto a computer chip that also contains (internally) the PCI bus.

The controller 10 connects to a host or host computer 12 through a bus interface or bus 14. One type of bus 14 is a PCI bus, which is a bus having specifications according to the Peripheral Component Interconnect (PCI) bus standard. Typically, the bus 14 connects to the host computer 12 via appropriate interface logic or control logic located at each end of the connection. Such logic, when identified as stand-alone, sometimes is referred to as an input controller or an interface controller. However, in this discussion, such logic will be referred to as interface logic or control logic to avoid confusion with the controller 10.

For example, the bus 14 is connected between a first interface logic 16 that is part of the host computer 12, and a host interface logic 18, which is part of the controller 10. Each interface logic contains appropriate control logic for allowing the host computer 12 and the controller 10 to properly communicate with each other via the bus 14. Also, typically, the first interface logic 16 contained within the host computer 12 includes appropriate control logic that allows the host computer 12 to interface with other system components, e.g., a host memory device 22, via an appropriate host memory bus 24 and a memory interface logic 26, or via some other suitable interface arrangement.

A plurality of data storage devices are connected to the controller 10. For example, a readable/writeable hard disk (HD) 32 and a readable/writeable compact disk (CD-RW) 34, both using the disk drive interface standard known as Advanced Technology Attachment (ATA), also known as Integrated Drive Electronics (IDE), are connected to the controller 10 via an interface 36 such as a daisy-chained IDE cable and appropriate device interface logic 38. It should be understood that other suitable arrangements exist for connecting data storage devices to the controller 10. In general, the interface 36 allows the controller 10 to transfer data from either of the data storage devices 32, 34 to the host memory 22 (via the host 12) or to transfer data to either of the data storage devices 32, 34 from the host memory 22.

In a conventional data transfer operation from a first device to a second device, a data set or data file is read from the first or source device, e.g., the hard drive 32, through the controller 10 and the host 12, to the host memory 22. Then, the data set is written from the host memory 22 to the second or destination device, e.g., the CD-RW drive 34, back through the host 12 and the controller 10. From a slightly more detailed perspective, the data transfer operation is broken down into multiple data transfers, with each data transfer typically transferring no more than 64 kilobytes (Kbytes). In general, at the bit level, data transfers involve the use of Physical Region Descriptor Tables, which contain a plurality of Physical Region Descriptors (PRDs).

The PRDs are created by the host once the host is notified of a copy operation request by one of the devices. Typically, each PRD contains eight bytes: two Dwords of four bytes each. The first Dword of each PRD contains the Memory Region Physical Base Address. In the second Dword of each PRD, the first two bytes are reserved. However, the most significant bit in this reserved field indicates, e.g., with a logical one, whether the end of the table has been reached. The second two bytes of the second Dword in each PRD contain a field for the PRD Byte Count. The Byte Count field indicates how many bytes are to be transferred starting at the Memory Region Physical Base Address. If the Byte Count is zero, then 64 Kbytes are to be transferred. For a copy operation of 600 Megabytes (Mbytes), e.g., to a CD-RW from a hard disk, the copy operation is broken down into approximately 10,000 PRDs using multiple PRD tables, or the same PRD table recycled with new contents.

To verify that the data transfer occurred without errors, the transferred data typically is read back. In one conventional method, the original data is read back from the source device (e.g., the hard disk 32) to the host 12, the copied data is read back from the destination device (e.g., the CD-RW drive 34) to the host 12, and the two are compared by the host 12, e.g., using a conventional program that identifies differences between two sets of data. In another conventional data verification method, the host 12 takes a digital signature or fingerprint of the copied data set and compares it with a precomputed digital signature from the source data set. In this manner, only the copied data set has to be read back from the destination device to the host 12. For example, an algorithm such as the MD5 algorithm precomputes a digital signature known as a "message digest" of the source data set before the source data set is copied. After the copy operation, the copied data set is read back from the destination device to the host 12 and the MD5 algorithm, typically located within the host 12, computes the digital signature of the copied data set and compares the digital signature of the copied data set with the digital signature of the source data set.

However, in either method, at least one data set has to be read back over the bus 14 into the host memory 22, where the host 12 can access the data and perform data verification processes. Thus, for a conventional data transfer operation and verification, a complete data set is transferred three or four times, with each of the data set transfers occupying computing resources such as the bus 14, the host memory 22 and the host 12.

Referring now to FIG. 2, with continued reference to FIG. 1, shown is a simplified diagram of the utilization of the bus 14 connected between a conventional host controller (e.g., the controller 10) and a host computer (e.g., the host 12), as a function of time, during a data transfer operation between two external devices. For example, for a transfer of data between the hard disk 32 and the CD-RW 34, the host 12 receives a request for a data transfer from the source device, e.g., the hard disk 32. The host 12, upon receipt of the data transfer request, performs an initial setup (shown as 42) for the data read transfer over the bus 14, including the creation of PRD tables, e.g., as discussed hereinabove. For purposes of illustration, only two PRD tables for the data read operation and two PRD tables for the data write operation are shown and described herein.

After the initial setup 42, the controller 10 accesses the first PRD table (shown generally as 44) for the byte count and the memory address (among other information) for the data about to be read. A first buffer portion 46 of data from the data set is read from the hard disk 32 (i.e., the source device) to the controller 10 via the interface 36 and then read to the host memory 22 via the bus 14, the host 12 and the host memory bus 24. The read operation of the first buffer portion 46 of the data across the bus 14 is shown generally by the arrow 48.

The controller 10 then accesses the next PRD table (shown generally as 52) and the next buffer portion, e.g., a second buffer portion 54, of the data set is read from the hard disk 32 to the controller 10, and then to the host memory 22 via the bus 14, the host 12, the host memory bus 24. The data read of the second buffer portion 54 of the data across the bus 14 is shown generally by the arrow 56. In the manner just described, the controller 10 then access subsequent PRD tables (not shown) and subsequent data reads (not shown) are performed until all of the data in the data set has been read from the hard disk 32 to the host memory 22.

After the data set has been read from the hard disk 32 to the host memory 22, the controller 10 issues an interrupt (shown as 58) across the bus 14. Then, the host 12 performs a setup (shown as 62) for the data write operation, including the creation of PRD tables. The controller 10 then accesses the first of the write PRD tables (shown generally as 64) and the first buffer portion of the data (shown as 66), which previously was read to the host memory 22, is written from the host memory 22 to the controller 10 via the host memory bus 24, the host 12, and the bus 14, and then to the destination device (e.g., the CD-RW 34) via the device interface 36. The data write operation of the first buffer portion 66 of the data set is shown generally by the arrow 68.

Next, the controller 10 accesses the next PRD table (shown generally as 72) and the next buffer portion (shown as 74) of the data set, which previously was read from the hard disk 32 to the host memory 22, is written from the host memory 22 to the controller 10 (via the host memory bus 24, the host 12, and the bus 14) and then to the destination device (e.g., the CD-RW 34) via the device interface 36. Such data write operation is shown generally by the arrow 76. After all of the data in the data set has been written to the destination device, the controller 10 issues an interrupt (shown as 78) to the host 12.

Figure 3:
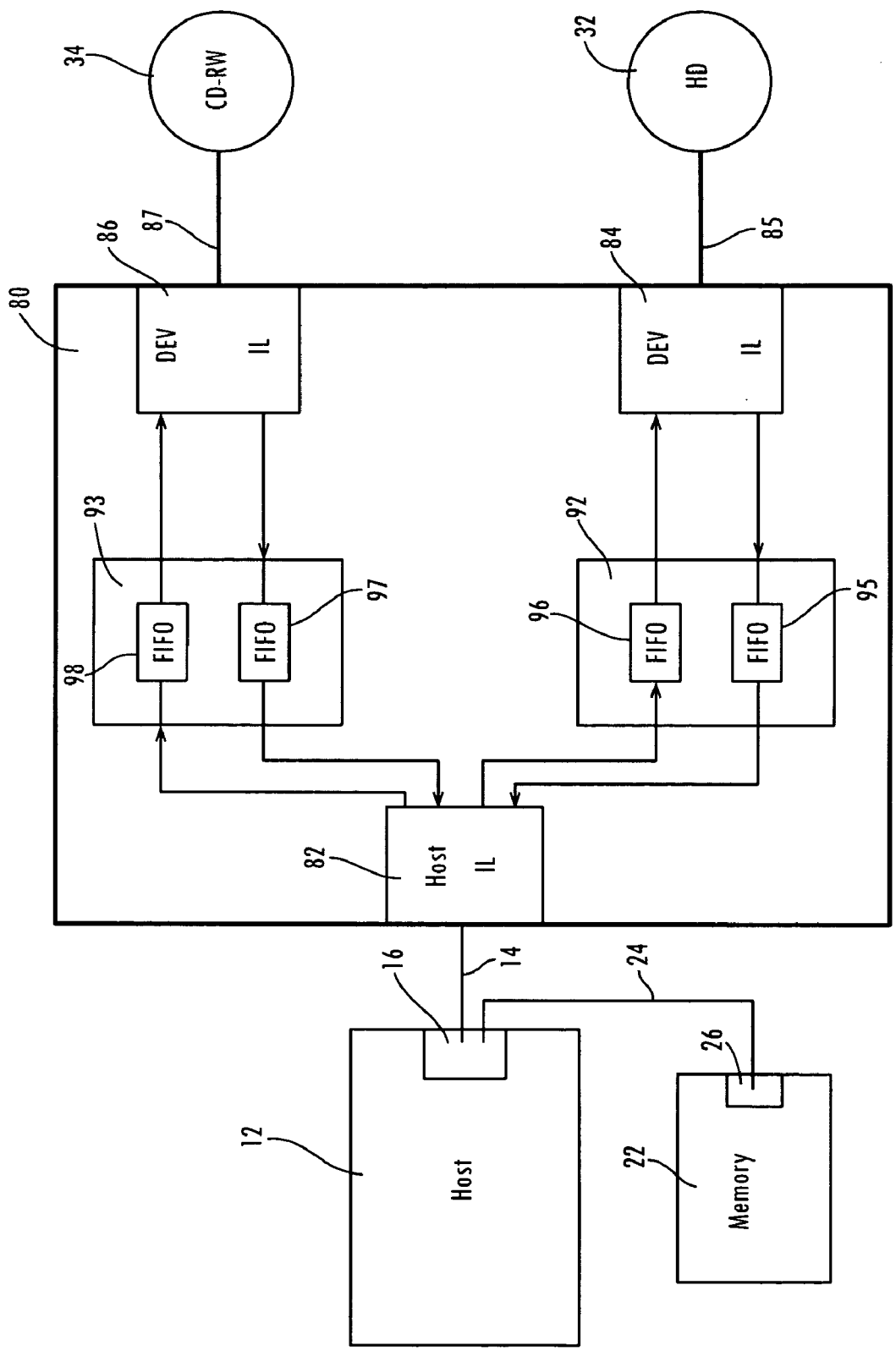
FIG. 3 is a simplified schematic diagram of a conventional SATA host controller interfaced between a bus such as a PCI bus and a plurality of data storage devices.

Referring now to FIG. 3, shown is a simplified schematic diagram of another conventional controller 80, e.g., a host controller that interfaces with data storage devices manufactured and operating in accordance with the Serial Advanced Technology Attachment (SATA or S-ATA) disk drive interface standard, which standard evolved from the ATA standard. Such a controller 80, i.e., a SATA host controller, interfaces between the host 12 (via the bus 14) and a plurality of data storage devices such as the hard disk 32 and a CD-RW 34. The controller 80 includes interface logic or control logic 82 that allows the controller 80 to interface with the bus 14.

The controller 80 also includes separate device interface logic or control logic that allows each data storage device to interface directly with the controller 80, rather than through a daisy-chained arrangement, e.g., as shown in FIG. 1. That is, the controller 80 includes a first device interface logic 84, which allows a first device, e.g., the hard disk 32, to connect directly to the controller 80 via a first interface 85. Also, the controller 80 includes a second device interface logic 86, which allows a second device, e.g., the CD-RW 34, to connect directly to the controller 80 via a second interface 87. Each of the first and second interfaces is, e.g., an IDE cable or other suitable interface.

The controller 80 includes a pair of memory buffers 92, 93. The memory buffers include, e.g., First In First Out memories (FIFOs), that smooth data transfer through the controller 80 by temporarily storing data being transferred. For example, the first memory buffer 92 includes a first FIFO 95 connected between the host interface logic 82 and the first device interface logic 84 to smooth the transfer of data from the hard disk 32 to the host 12. Also, the first memory buffer 92 includes a second FIFO 96 connected between the host interface logic 82 and the first device interface logic 84 to smooth the transfer of data from the host 12 to the hard disk 32, e.g., data being written from the host memory 22 to the hard disk 32. Similarly, the second memory buffer 93 includes a third FIFO 97 and a fourth FIFO 98 connected between the host interface logic 82 and the second device interface logic 86 to smooth the transfer of data between the host 12 and the CD-RW 34.

Also, typically, the controller 80 includes flow control hardware (not shown) to keep both buffers from filling up with data beyond a certain level. That is, the flow control hardware prevents the source side of the memory buffers from sending additional data until the destination side of the memory buffers has emptied some of the data stored in that buffer. In this manner, data being transferred is not lost.

In the conventional arrangement shown in FIG. 3, both of the devices 32, 34 can transfer data to or from the controller 80 simultaneously. However, the controller 80 still must perform the same data transfer steps as those of the controller 10 in the arrangement shown in FIG. 1, including the steps of setting up PRD tables for data transfer from the source device to the host memory 22 and setting up PRD tables for data transfer from the host memory 22 to the destination device.

With respect to the transfer of data to or from the host memory 22, the controller 80 includes hardware to support a Direct Memory Access (DMA) transfer. In a DMA transfer, data interacts directly with the host memory 22 without the intervention of the host 12. For example, data transferred from a source device would be read by the controller 80 and then pass from the controller 80 to the host memory 22 via the host interface logic 16, the host memory bus 24, and the memory interface logic 26. Similarly, data transferred from the host memory 22 would pass to the controller 80 via the memory interface logic 26, the host memory bus 24 and the host interface logic 16. The data then would be written from the controller 80 to the destination device.

From an operational standpoint, a DMA transfer involves the controller 80 requesting and obtaining permission from a bus arbiter (not shown) to be the bus master of the bus 14 between the controller 80 and the host 12. Typically, the bus arbiter is not part of the controller 80, e.g., the bus arbiter is part of the host 12. Once the bus arbiter has given permission for the controller 80 to be bus master of the bus 14, the controller 80 interacts directly with the host memory 22, i.e., without the intervention of the host 12, to manage the transfer of data between the data storage devices.

As discussed previously herein, many conventional data transfer operations involve several data transfers across the bus between the host and the controller, as well as periodically occupying the host and the host memory. The occupation of these computing resources adversely affects the ability of competing devices and their interfaces, e.g., Universal Serial Bus (USB) and Firewire interfaces, to make use of these resources.

According to embodiments of the invention, a controller includes an enhanced configuration that can relieve the bus, the host and the host memory of much of the data transfer responsibilities during most data transfer operations. Also, the time required for the data transfer is reduced and the data transfer components dissipate less power. According to embodiments of the invention, the enhanced controller directs data from the source device directly to the destination device, bypassing the bus between the controller and the host (and thus the host memory). Alternatively, the enhanced controller also performs data verification operations without occupying computing resources such as the host, the host memory, and the bus between the controller and the host.

Figure 4:
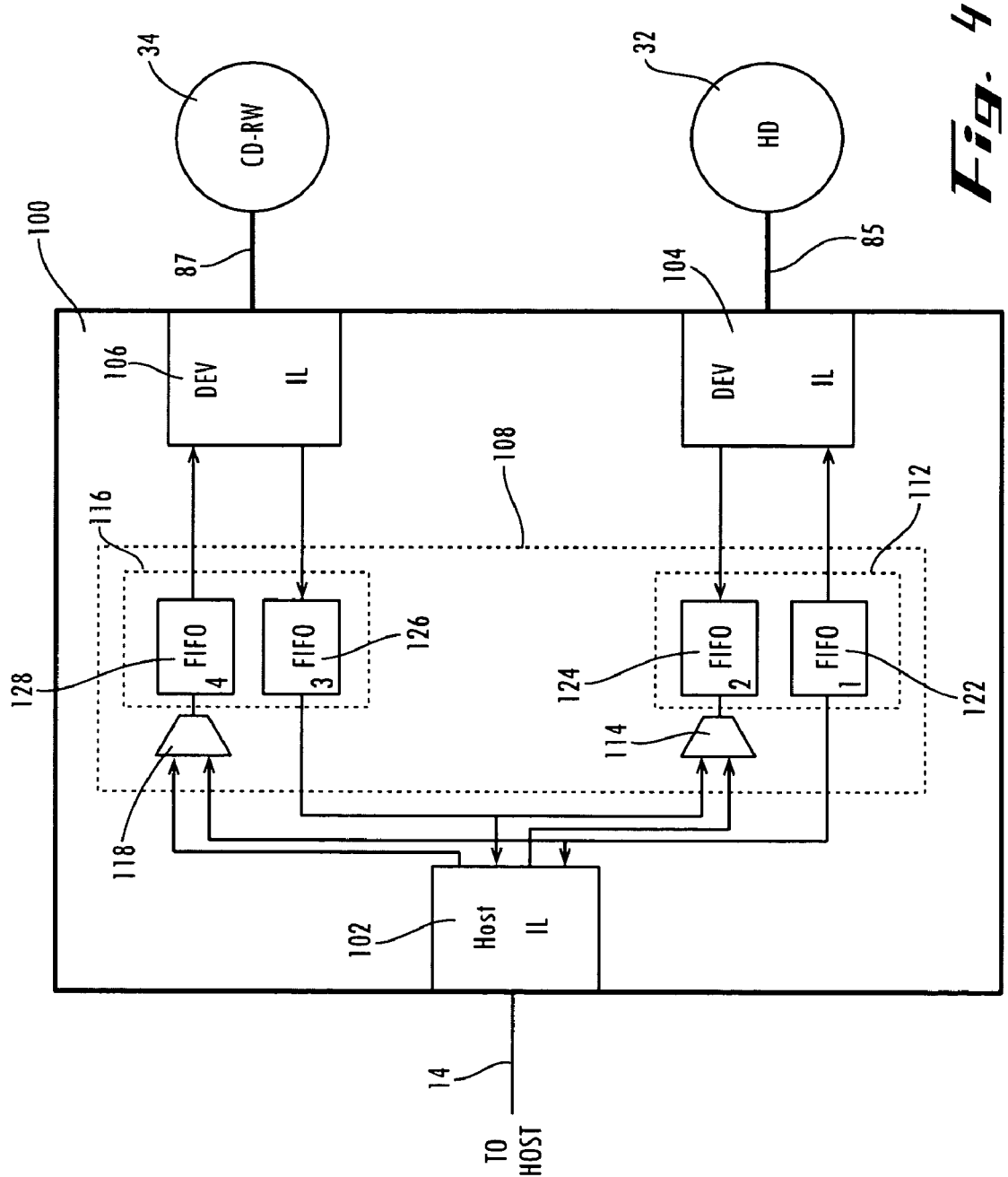
FIG. 4 is a simplified schematic diagram of a controller such as a SATA host controller according to embodiments of the invention.

Referring now to FIG. 4, shown is a simplified schematic diagram of a controller 100 according to embodiments of the invention. According to embodiments of the invention, the controller 10 or a portion of the controller 100 is physically located on a computer circuit board that is plugged into a PCI slot on the motherboard. According to alternative embodiments of the invention, the controller 10 or a portion of the controller 10 is fabricated as an integrated circuit.

The controller 100 includes a host interface logic or control logic 102, a first device interface logic 104, a second interface logic 106, and a switching circuitry 108. The host interface logic 102 allows the controller 100 to interface with the host 12 (shown in FIGS. 1 and 3) via the bus 14, e.g., a PCI bus. As discussed hereinabove, the host typically interfaces with other system components, including a host memory device 22 (shown in FIGS. 1 and 3).

The first device interface logic 104 allows the controller 100 to interface with a first device, e.g., the hard disk 32, via the interface 85, which is an IDE cable or other suitable interface. The second device interface logic 106 allows the controller 100 to interface with a second device, e.g., the CD-RW 34, via the interface 87, which is an IDE cable or other suitable interface.

The switching circuitry 108 connects between the host interface logic 102 and the device interface logic, i.e., the first device interface logic 104 and the second device interface logic 106. As will be discussed in greater detail hereinbelow, according to embodiments of the invention, the switching circuitry 108 allows data transfer between the data storage devices to remain within the controller 100, without unnecessarily involving the computing resources of the host, the host memory, and the bus 14 between the host and the controller 100.

A first portion of the switching circuitry 108 includes a first memory buffer 112 and a first multiplexing circuitry 114 connected between the host interface logic 102 and the first device interface logic 104. Another portion of the switching circuitry 108 includes a second memory buffer 116 and a second multiplexing circuitry 118 connected between the host interface logic 102 and the second device interface logic 106.

The first memory buffer 112 temporarily stores data being transferred to and from the first device (e.g., the hard disk 32) via the first device interface logic 104 and the interface 85. The first memory buffer 112 includes at least one buffer device (e.g., a first FIFO memory 122) that temporarily stores data read from the first device 32, and at least one buffer device (e.g., a second FIFO memory 124) that temporarily stores data to be written to the first device 32.

Similarly, the second memory buffer 116 temporarily stores data being transferred to and from the second device (e.g., the CD-RW 34), via the second device interface logic 106 and the interface 87. The second memory buffer 116 includes at least one buffer device (e.g., a third FIFO memory 126) that temporarily stores data read from the second device 34, and at least one buffer device (e.g., a fourth FIFO memory 128) that temporarily stores data to be written to the second device 34.

The first multiplexing circuitry 114 includes circuitry that allows the memory device that stores data to be written to the first device (i.e., the second FIFO memory 124) to receive data from either the bus 14, via the host interface logic 102, or the second device 34, via the third FIFO memory 126. Similarly, the second multiplexing circuitry 118 includes circuitry that allows the memory device that stores data to be written to the second device (i.e., the fourth FIFO memory 128) to receive data from either the bus 14, via the host interface logic 102, or the first device 32, via the first FIFO memory 122. According to embodiments of the invention, the first multiplexing circuitry 114 and the second multiplexing circuitry 118 are any suitable circuitry that controllably allows data to be received from more than one source.

The switching circuitry 108 includes the appropriate control circuitry (not shown) to inform the first and second memory buffers 112, 116 and the first and second multiplexing circuitry 114, 118 whether data read from the source device is to be transferred to the host (and the host memory) via the bus 14, e.g., in a conventional manner, or transferred directly to the destination device via the respective memory buffer. The control circuitry within the switching circuitry 108 also enables or disables the ability of the first and second multiplexing circuitry 114, 118 to receive data from the host and from the memory buffer of the source device.

According to embodiments of the invention, the host informs the control circuitry in the switching circuitry whether the data is to be transferred from the source device directly to the destination device or through the host and the host memory and then to the destination device. For example, the host sets a register control bit in the switching circuitry to indicate that the data for transfer is to be written directly from the source device to the destination device. The appropriate control bits are set in the multiplexing circuitry to disable the ability of the multiplexing circuitry to receive data from the host and to enable the ability of the multiplexing circuitry to receive data from the memory buffer of the source device. Otherwise, if the register control bit is not set, data is transferred in a conventional manner, i.e., from the source device to the host memory and then from the host memory to the destination device.

Figure 5:
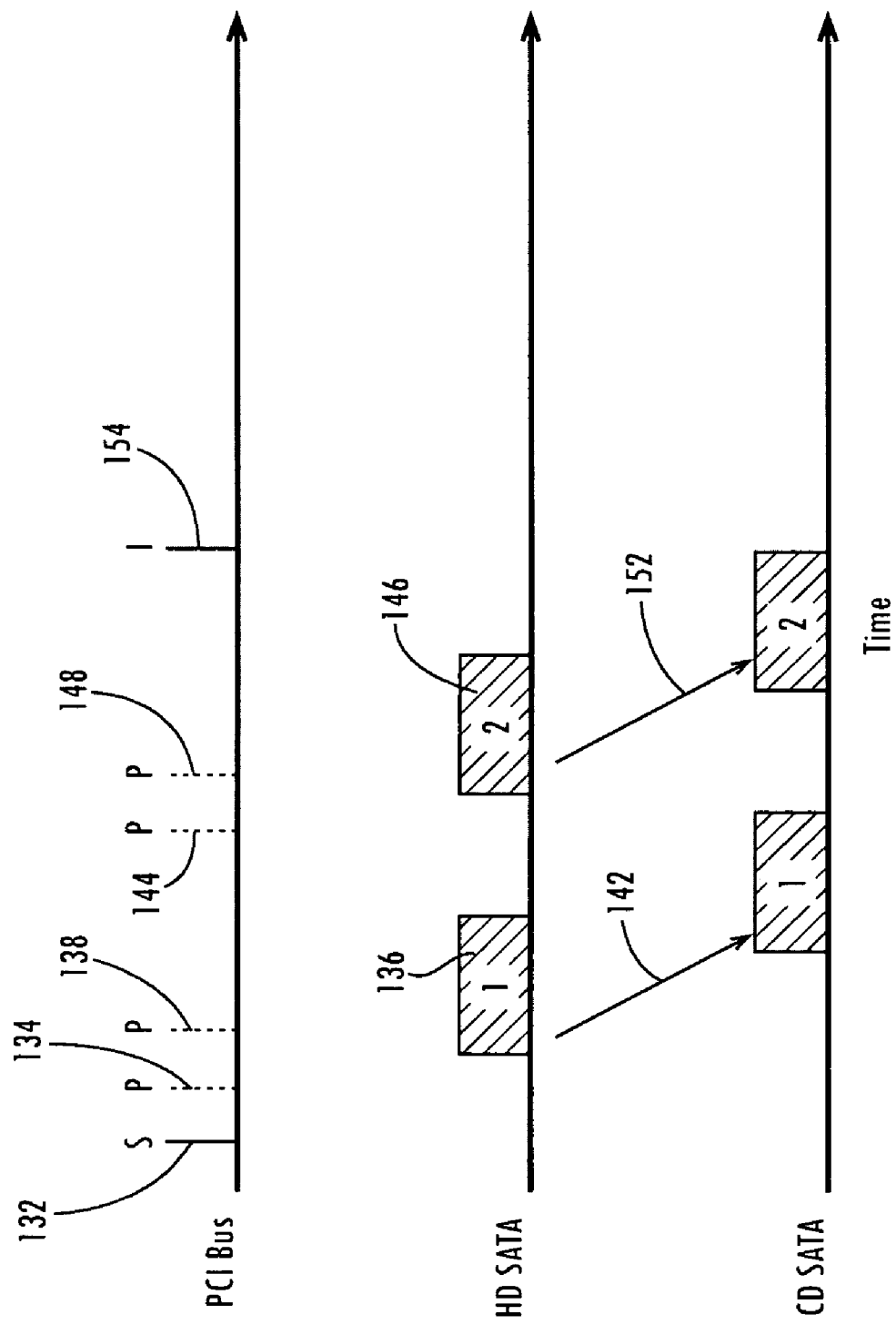
FIG. 5 is a simplified diagram of the bus utilization during a copy operation between two external devices, using the controller of FIG. 4.

Referring now to FIG. 5, with continued reference to FIG. 4, shown is a simplified diagram of the utilization of the bus 14 connected between the host and the controller 100 according to embodiments of the invention, as a function of time, during a data transfer operation between a source device (e.g., the hard disk 32) and a destination device (e.g., the CD-RW 34). Initially, the host, upon receipt of a request for data transfer from the source device, performs an initial setup (shown generally as 132). The setup includes the creation of the appropriate PRD tables.

For example, according to embodiments of the invention, the host sets up, e.g., simultaneously, one or more PRD tables for reading the data to be transferred from the source device and one or more PRD tables for writing the data to be transferred to the destination device. Also, as discussed hereinabove, the host sets the appropriate register bit to inform the switching circuitry 108 that the data for transfer is to be transferred directly from source device, through the appropriate read buffer, to the input of the appropriate multiplexing circuitry, through the appropriate write buffer, and to the destination device. In this manner, the switching circuitry 108 will cause data read from the source device to bypass the bus 14 (and the host interface logic 102) and instead be directed to the input of the multiplexing circuitry in the write path of the destination device (e.g., multiplexing circuitry 118). Also, the multiplexing circuitry in the write path of the destination device will know to accept data from the memory buffer in the read path of the source device (e.g., the first FIFO 122), rather than from the bus 14.

Once the host performs the initial setup 132 and creates the appropriate PRD tables, the controller 100 accesses the first PRD table (shown generally as 134) for the byte count. Note that, according to embodiments of the invention, the controller 100 does not need to know a memory address, since the data to be transferred will not be written to a location in the host memory. Since the PRD tables are located in the host 12 or in the host memory 22 (See, e.g., FIGS. 1 and 3), the controller 100 accesses the PRD tables via the bus 14. Once the controller 100 accesses the first PRD table for the byte count, a first portion of the data to be transferred (shown generally as 136) is read from the source device (e.g., the hard disk 32) to the controller 100, via the interface 85 and the interface logic 104.

The first portion 136 of data is stored temporarily in the appropriate memory buffer of the source device (in this example, the first FIFO memory 122). From there, the controller 100 typically would access a first write PRD table. However, the controller 100 only needs the byte count, which would be the same in a first write PRD table as it is in the first read PRD table. Therefore, according to embodiments of the invention, the controller 100 can access the first read PRD table again for the byte count. Thus, a first write PRD table does not have to be created. In this manner, the number of PRD tables (namely write PRD tables) that has to be created is reduced, simplifying the overall processing required by the controller 100. Once the controller 100 access the byte count again from the first read PRD table (shown generally as 138), the first portion 136 of data is transferred directly to the appropriate memory buffer of the destination device (in this example, the fourth FIFO memory 128) via the appropriate multiplexing circuitry (in this example, the second multiplexing circuitry 118).

As discussed previously herein, the host has set appropriate control register bits that let the controller 100 know that the first portion 136 of data is to bypass the host interface logic 102 and transfer directly from the source device memory buffer to the destination device memory buffer via the destination device multiplexing circuitry. Also, the destination device multiplexing circuitry knows from the settings of the control register bits that data is to be received from the source device memory buffer and not from the host interface logic 102. From the destination device multiplexing circuitry, the first portion 136 of data is written to the destination device (e.g., the CD-RW 34) via the second device interface logic 106 and the interface 87. The write operation of the first portion 136 of data to the destination device is shown generally by the arrow 142.

The controller 100 then accesses the next read PRD table (shown generally as 144) for the byte count. Once the controller 100 obtains the byte count, the second or next portion of data to be transferred (shown generally as 146) is read from the hard disk 32 (i.e., the source device) to the controller 100, via the interface 85 and the device interface logic 104. Again, the second portion 146 of data is stored temporarily in the first FIFO memory 122. Then, the controller 100 accesses the next write PRD table (shown generally as 148), and the second portion 146 of data is transferred directly from the first FIFO memory 122 to the fourth FIFO memory 128, via the second multiplexing circuitry 118. Then, the second portion 146 of data is written to the CD-RW 34 (destination device) via the second device interface logic 106 and the interface 87. The write operation of the second portion 146 of data to the CD-RW 34 is shown generally by the arrow 152.

Similarly, the controller 100 then access subsequent read PRD tables and write PRD tables (not shown) and subsequent data reads and data writes (not shown) are performed until all of the data in the data set has been read from the hard disk 32 to the CD-RW 34. After the entire data set has been read from the hard disk 32 and written to the CD-RW 34, the controller 100 issues an interrupt (shown as 154) across the bus 14.

As can be seen in FIG. 5, during the transfer of data from the source device (e.g., the hard disk 32) to the destination device (e.g., the CD-RW 34), the bus 14 between the host and the controller 100 is used only for the initial transfer request (part of the initial setup 132), for access of the PRD tables by the controller 100, and the interrupt 154 issued by the controller 100. Such bus use compares favorably with the bus use during conventional data transfers between devices, e.g., as shown in FIG. 2.

As discussed previously herein with respect to conventional data transfer operations, once data is transferred from a source device to a destination device, the integrity of the data transfer is verified through the use of some type of data verification operation. For example, a digital signature such as a message digest of the copied data set is taken and compared with a precomputed (typically) digital signature of the original data set. Conventionally, the data verification instruction set or algorithm (e.g., the MD5 algorithm) usually resides in the host memory, and the host performs the data verification process to obtain a digital signature of copied data set and compares the digital signature with the precomputed signature of the original data set. However, as discussed previously herein, verification in this manner involves at least one complete transfer of the entire data set over the bus from the controller to the host (and sometimes the host memory), in addition to the computing resources required of the host to perform the data verification.

Therefore, according to alternative embodiments of the invention, the controller 100 is configured to include data verification circuitry. By including data verification circuitry, the controller 100 relieves the host, the host memory and the bus 14 between the host and the controller 100 of even more duties, i.e., data transfer and processing duties related to the data verification portion of data transfer operations.

Referring now to FIG. 6, shown is a simplified schematic diagram of a controller 100 according to alternative embodiments of the invention. The configuration of the controller 100 in this alternative embodiment is similar to the configuration of the controller 100 shown in FIG. 4, however, in this alternative embodiment, the controller also includes the appropriate data verification logic or circuitry (shown as 156). According to embodiments of the invention, the data verification circuitry 156 includes the necessary hardware and/or software for performing any suitable data verification operation, e.g., any suitable message digest algorithm such as conventional MD2 or MD5 algorithms, or any suitable cyclic redundancy check (CRC) circuitry such as conventional CRC-32 or CRC-64 circuitry.

Depending on the data verification technique, the size and complexity associated with the circuitry implementation may dictate which data verification operation is best suited to be included as part of the controller 100. For example, the implementation of some message digest algorithms may require that relatively large circuits be added to the existing controller circuitry. Similarly, the use of some redundancy techniques, e.g., CRC-32, may require a relatively large amount of processing by the controller 100. However, it is to be understood that, according to embodiments of the invention, any suitable data verification technique is incorporated into the controller 100.

As shown in FIG. 6, the controller 100 includes, e.g., a CRC-64 data verification circuitry 156. The data verification circuitry 156 is implemented in the controller 100 to be in operable communication with the host interface logic 102. Also, the data verification circuitry 156 is configured in the controller 100 in such a way that the inputs to the data verification circuitry 156 are connected to the outputs of the buffer devices that temporarily store data that is read from the first or second devices. That is, the output of the first FIFO memory 122, which temporarily stores data read from the first device (e.g., hard disk 32) when the first device 32 is the source device, is one of the inputs to the data verification circuitry 156. The other input to the data verification circuitry 156 is the output of the third FIFO memory 126, which temporarily stores data read from the second device (e.g., CD-RW 34) when the second device 34 is the source device.

In operation, the data verification circuitry 156 receives data that also is being transferred from the output of the memory buffer of the source device to the input of the multiplexing circuitry of the destination device. As the data verification circuitry 156 receives the data being transferred, the data verification circuitry 156 accumulates the running data verification information, e.g., the CRC-64 value, until the entire data set has been transferred to the memory buffer of the destination device. Once the entire data set has been transferred, the data verification circuitry 156 has stored therein necessary data verification information, which then can be read by the host, e.g., in a conventional manner.

If the host already has data verification information for the original data set, then the data verification information accumulated by the data verification circuitry 156 for the copied data is read by the host and compared with the previously existing data verification information for the original data set. If the host does not have verification information for the original data set, then the data verification circuitry 156 accumulates the running verification information as the original data set is being copied to the destination device, e.g., as described above. Then, once the entire data set has been transferred to the destination device, the data verification circuitry 156 can accumulate the running data verification information from a subsequent pass of the copied data set from the destination device to the data verification circuitry 156. Then, the host can read this data verification information from the copied data set and compare it to the data verification information accumulated from the original data set, i.e., from the original data transfer from the source device to the destination device.

According to embodiments of the invention, in the manner just described, data verification is performed as the data set is being transferred directly from the source device to the destination device. Unlike conventional arrangements using data verification, according to embodiments of the invention, the entire data set does not have to be read over the bus 14 from the controller 100 to the host for data verification computations. Instead, data verification is performed by the data verification circuitry 156 in the controller 100. Only the final data verification results are transferred from the controller 100 to the bus 14. Therefore, in this manner, for data verification purposes, the use of the host, the host memory, and the bus 14 are reduced compared to conventional arrangements.

Referring now to FIG. 7, shown is a simplified schematic diagram of a plurality of controllers according to another alternative embodiment of the invention. According to embodiments of the invention, data transfer is not limited to devices connected to the same controller. Data can be transferred from a source device interfaced with one controller to a destination device interfaced with a different controller.

The multiple controller arrangement 160 according to alternative embodiments of the invention includes, e.g., a first controller 162 such as a SATA host controller, a second controller 164 such as a SATA host controller, and a hardware switch 166 such as a bus switch or a PCI switch. The first controller 162 has connected thereto a plurality of devices, e.g., a first device 172 such as a hard disk, and a second device 174 such as a CD-RW. Similarly, the second controller 164 has connected thereto a plurality of devices, e.g., a third device 176 such as a hard disk, and a fourth device 178 such as a CD-RW. The devices are connected to their respective controller via an appropriate interface, e.g., as discussed hereinabove with respect to other embodiments of the invention. Although the multiple controller arrangement 160 shows two controllers connected to the switch 166, embodiments of the invention include arrangements in which more than two controllers are connected to the switch 166 via the appropriate interfaces.

Unlike previous embodiments of the invention, in which a single controller is interfaced directly with the host 12 via a bus such as a PCI bus, according to this alternative embodiment of the invention, the controllers 162, 164 are connected to the hardware switch 166. Each controller is connected to the switch 166 via an appropriate interface, e.g., a PCI Express connection. The switch 166 is connected to the host 12 via an appropriate interface, e.g., the bus 14, which, as discussed hereinabove can be a PCI bus.

In operation, during a data transfer request from one of the devices to the host 12, a test is performed (e.g., by the host 12) to determine whether the source device and the destination device are connected to the same controller. The ability to test in this manner can be part of the operating system, e.g., as discussed in greater detail hereinbelow, or can be part of the appropriate driver software.

If the source device and the destination device are connected to the same controller, data transfer is performed according to embodiments of the invention as discussed hereinabove or in a conventional manner. If the source device and the destination device are not connected to the same controller, control logic in the host 12 and in the controllers 162, 164 manages the data transfer between the source device connected to one controller, through the switch 166, and to the destination device connected to the other controller. The transfer of data within each controller is managed by the switching circuitry and interface logic contained in the individual controllers, e.g., as discussed hereinabove with respect to other embodiments of the invention.

For example, in transferring a data set from the first device 172 to the fourth device 178, the data is transferred from the first (source) device 172 to the first controller 162, e.g., as discussed hereinabove with respect to embodiments of the invention. However, since the destination device is connected to another controller, the data is transferred to the switch 166 via the interface between the first controller 162 and the switch 166, and then from the switch 166 to the second controller 164 via the interface between the switch 166 and the second controller 164. The data then is transferred from the second controller 164 to the fourth (destination) device 178, e.g., as discussed hereinabove with respect to embodiments of the invention.

Therefore, even though data is being transferred between devices connected to different controllers, according to embodiments of the invention, the data transfer occurs over connections between the controllers and the bus switch 166. The bus 14 between the switch 166 and the host 12 is used for certain functions, e.g., initial data transfer requests (part of the setup), PRD table access by the controllers ?, and controller-issued interrupts. However, like other embodiments of the invention, in this alternative embodiment of the invention, the host bus 14, the host 12 and the host memory (not shown) are not used for transferring data.

According to embodiments of the invention, the improved data transfer described herein is compatible with various other features and standards that may be used by the host and/or the controller(s). For example, many controllers are configured to operate according to a standard known as SATA II. In this standard, there are optional features that allow a data storage device to optimize data transfers such as DMA transfers. Some of these features may interfere with the inventive data transfer methods described hereinabove, while other features may not. According to embodiments of the invention, the host is configured to disable any of the optional features that may adversely affect the inventive data transfer method described herein prior to the execution of the inventive data transfer method, and enable such optional features once the data transfer method is completed. Such features that are disabled include, e.g., a feature known as "Non-Zero Buffer Offset in DMA Setup Frame Information Structure (FIS)," which feature allows data transfer to occur from locations in the data set other than the beginning, with the beginning of the data set transferred in later operations. Since this feature may disrupt the inventive data transfer, it is disabled prior to the data transfer method according to embodiments of the invention being performed. Another feature that is disabled is, e.g., a feature known as Native Command Queuing (NCQ), which allows multiple, partial data transfers.

For optional features that do not interfere with the inventive data transfer method, such features are left enabled while the inventive data transfer method is performed. Such features that remain enabled include, e.g., a feature known as "Guaranteed In-Order Data Delivery," which feature stops the data storage device from performing an optimization by returning data out of order.

With respect to Native Command Queuing (NCQ), according to alternative embodiments of the invention, additional circuitry and control logic is added to the existing switching circuitry 108 to accommodate the operation of NCQ along with data transfer operations according to embodiments of the invention. The additional circuitry and control logic allows the controller 100 to detect and identify multiple source and destination devices, to provide appropriate buffer storage for the additional data to be stored, and to select from among the multiple devices which source and destination devices are to be used in the data transfer. The control logic also sets the appropriate flags and control bits to control the data transfer while the NCQ operation is enabled. In this manner, data transfer according to embodiments of the invention is performed without disabling the NCQ feature.

Finally, according to embodiments of the invention, the instructions for the improved data transfer methods described hereinabove reside in the host, the host memory or other suitable locations that are accessible by the host. For example, the instructions are a standalone utility program, residing in a portion of the host memory, that is readily accessible by the operating system of the host. Alternatively, the instructions are part of the host operating system.

For example, the existing copy command of the host operating system is modified to incorporate the instructions for the improved data transfer method according to embodiments of the invention. In this manner, the host will determine automatically as part of the execution of the copy command if the data transfer can be accomplished according to embodiments of the invention, i.e., without transferring the data to the host and the host memory. The host will determine if the source device and the destination device are connected to the same controller or different controllers that are linked together appropriately, e.g., by a bus switch, as discussed previously herein. If so, the copy command can provide the necessary instructions to the controller(s) to perform the data transfer according to embodiments of the invention. If not, the copy command can instruct the controller(s) to perform the data transfer in a conventional manner.

It will be apparent to those skilled in the art that many changes and substitutions can be made to the embodiments of the invention herein described without departing from the spirit and scope of the invention as defined by the appended claims and their full scope of equivalents. For example, according to embodiments of the invention, data could be read from a source device to a plurality of destination devices simultaneously, e.g., through the same controller or through the bus connected between the controller and the host.

The invention claimed is:

1. A controller for controlling the transfer of data from a first device to at least one second device, the controller comprising:
   a host interface logic for connecting the controller to a host via a bus, the host having a host memory device connected thereto;
   a first device interface logic for connecting the controller to the first device, wherein the first device interface logic reads data from the first device;
   a second device interface logic for connecting the controller to the at least one second device, wherein the second device interface logic writes data to the second device; and
   a switching circuitry having a first portion connected between the host interface logic and the first device interface logic and a second portion connected between the host interface logic and the second device interface logic,
   wherein the switching circuitry controls the transfer of data from the first device interface logic to the second device interface logic without the transferred data passing to the host interface logic, the host, the bus, and the host memory device, and
   wherein the host includes logic for performing at least one optimization feature, and wherein, when the host disables the at least one optimization feature, the controller controls the transfer of data between the first and second devices without the transferred data passing to the host interface logic, the host, the bus and the host memory device.

2. The controller as recited in claim 1, wherein the switching circuitry further comprises:
   a first buffer circuitry connected between the host interface logic and the first device interface logic,
   a second buffer circuitry connected between the host interface logic and the second device interface logic, and
   a multiplexing circuitry connected between the host interface logic and the first device interface logic and connected between the host interface logic and the second device interface logic.

3. The controller as recited in claim 1, further comprising data verification logic connected to the first buffer circuitry, the second buffer circuitry and the multiplexing circuitry, wherein the data verification logic is configured to perform at least one data verification operation on data transferred between the first device interface logic and the second device interface logic without the transferred data passing to the host interface logic and at least one of the bus, the host computer, and the host memory.

4. The controller as recited in claim 1, wherein the bus further comprises a Peripheral Component Interconnect (PCI) bus.

5. The controller as recited in claim 1, wherein at least a portion of the controller is fabricated as an integrated circuit (IC).

6. A method for controlling the transfer of data from a first data storage device to a second data storage device within a computer system, the system including a host having a host bus, a host memory connected to the host via a host memory bus, at least one controller connected to the host via the host bus, and a plurality of data storage devices connected to the at least one controller, the method comprising the steps of:
   reading data from a first data storage device to a first buffer portion of the controller;
   controllably transferring the data to a second buffer portion of the controller, wherein the data does not transfer to the host bus, the host, the host memory bus and the host memory; and
   writing the data from the second buffer portion of the controller to a second data storage device, and
   wherein the host includes logic for performing at least one optimization feature, and wherein the host disables the at least one optimization feature prior to the controller controlling the transfer of data between the first buffer circuitry and the second buffer circuitry without the transferred data passing to the host interface logic and to at least one of the host bus, the host computer, the host memory bus and the host memory.

7. The method as recited in claim 6, further comprising the step of performing, with a data verification logic portion of the controller, at least one data verification operation on data transferred between the first buffer portion of the controller and the second buffer portion of the controller without the transferred data passing to the host bus and at least one of the host, the host memory bus and the host memory.

8. The method as recited in claim 6, wherein the at least one controller further comprises a plurality of controllers connected to the host via a bus switch and a corresponding plurality of controller buses,
   wherein the data reading step further comprises reading data from a first data storage device connected to a first controller,
   wherein the data transferring step further comprises controllably transferring the data from the first controller through the bus switch and to a second controller having connected thereto a second data storage device, wherein the data is transferred without the data passing to the host bus and at least one of the host, the host memory bus and the host memory, and
   wherein the data writing step further comprises writing the data from the second controller to the second data storage device.

9. A controller for controlling the transfer of data from a first device to at least one second device within a computer system, the controller comprising:
   a host interface logic for interfacing the controller with a host computer via a first bus, wherein the host computer has a host memory interfaced therewith via a second bus;
   a first device interface logic for interfacing the controller with the first device via a first device bus, wherein the first device interface logic reads data from the first device via the first bus;
   a second device interface logic for interfacing the controller with the second device via a second device bus, wherein the second device interface logic writes data to the second device via the second bus;
   a first buffer connected between the first device interface logic and the host interface logic for controlling data transfer therebetween;
   a second buffer connected between the second device interface logic and the host interface logic for controlling data transfer between the second device interface logic and the host interface logic;
   a first multiplexing circuitry connected between the first buffer and the host interface logic and connected between the first buffer and the second buffer, wherein the first multiplexing circuitry controls the transfer of data from the second buffer to the first buffer without the data passing to the host interface logic and to at least one of the first bus, the host computer, the second bus and the host memory; and
   a second multiplexing circuitry connected between the second buffer and the host interface logic and connected between the second buffer and the first buffer, wherein the second multiplexing circuitry controls the transfer of data from the first buffer to the second buffer without the transferred data passing to the host interface logic and at least one of the first bus, the host computer, the second bus and the host memory,
   wherein the host computer includes logic for performing at least one Serial Advanced Technology Attachment (SATA) II optimization feature, and wherein, when the host computer disables the at least one SATA II optimization feature, the controller controls the transfer of data between the first and second devices without the transferred data passing to the host interface logic and to at least one of the first bus, the host computer, the second bus and the host memory.

10. The controller as recited in claim 9, wherein the transfer of data from the first device to the second device includes copying at least one set of data from the first device to the second device.

11. The controller as recited in claim 9, further comprising data verification logic connected to the first buffer and second buffer, wherein the data verification logic is configured to perform at least one data verification operation on data transferred between the first device and the second device without the transferred data passing to the host interface logic and at least one of the first bus, the host computer, the second bus and the host memory.

12. The controller as recited in claim 11, wherein the data verification logic is selected from the group consisting of a message digest (MD) algorithm and a cyclic redundancy check (CRC) circuit.

13. The controller as recited in claim 9, wherein the host computer includes logic for performing at least one Serial Advanced Technology Attachment (SATA) II optimization feature, and wherein, when the host computer disables the at least one SATA II optimization feature, the controller controls the transfer of data between the first and second devices without the transferred data passing to the host interface logic and to at least one of the first bus, the host computer, the second bus and the host memory.

14. The controller as recited in claim 9, wherein the host computer includes logic for performing native command queuing (NCQ), and wherein the controller further comprises native command queuing logic for controlling, when native command queuing is enabled, the transfer of data between the first and second devices without the transferred data passing through at least one of the first bus, the host computer, the second bus and the host memory.

15. The controller as recited in claim 9, wherein the controller further comprises a first controller and at least one second controller; wherein the first controller interfaces with a bus switch via a first controller interface; wherein the at least one second controller interfaces with the bus switch via a corresponding second controller interface; wherein the bus switch interfaces with the host computer via the first bus in such a way that the host computer interfaces with the first controller and the at least one second controller via the first bus, the bus switch, and the corresponding controller interface; and wherein the first controller, the bus switch, and the at least one second controller control the transfer of data between the first controller and the second controller without the transferred data passing through at least one of the first bus, the host computer, the second bus and the host memory.

16. The controller as recited in claim 9, wherein the first buffer further comprises:
   a first First In First Out (FIFO) buffer device connected between the first device interface logic and the host interface logic and connected between the first device interface logic and the second multiplexing circuitry, and
   a second FIFO buffer device connected between the first multiplexing circuitry and the first device interface logic.

17. The controller as recited in claim 9, wherein the second buffer further comprises:
   a third FIFO buffer device connected between the second device interface logic and the host interface logic and connected between the second device interface logic and the first multiplexing circuitry, and
   a fourth FIFO buffer device connected between the second multiplexing circuitry and the second device interface logic.

18. The controller as recited in claim 9, wherein at least one of the first bus, the first device bus and the second device bus further comprises a PCI bus.

19. The controller as recited in claim 9, wherein at least one of the first bus, the first device bus and the second device bus further comprises a PCI Express bus.

20. The controller as recited in claim 9, wherein at least a portion of the controller is fabricated as an integrated circuit (IC).

21. A computer system, comprising:
   a host having a host bus;
   a host memory connected to the host via a host memory bus;
   at least one controller connected to the host via the host bus; and
   a plurality of data storage devices connected to the at least one controller,
   wherein the at least one controller includes
      a host interface logic for connecting the controller to the host via the host bus, wherein the host interface logic transfers data between the host and the controller,
      a first device interface logic for connecting the controller to a first data storage device, wherein the first device interface logic reads data from the first data storage device,
      a second device interface logic for connecting the controller to a second data storage device, wherein the second device interface logic writes data to the second data storage device,
      a first buffer circuitry connected between the host interface logic and the first device interface logic, and controlling the transfer of data therebetween,
      a second buffer circuitry connected between the host interface logic and the second device interface logic, and controlling the transfer of data therebetween, and
      a multiplexing circuitry connected between the host interface logic and the first device interface logic and connected between the host interface logic and the second device interface logic,
      wherein the first buffer circuitry, the second buffer circuitry and the multiplexing circuitry are configured to be able to control the transfer of data between the first buffer circuitry and the second buffer circuitry without the transferred data passing to the host interface logic and to at least one of the host bus, the host, the host memory bus and the host memory,
   wherein the host includes logic for performing at least one optimization feature, and wherein the host disables the at least one optimization feature prior to the controller controlling the transfer of data between the first buffer circuitry and the second buffer circuitry without the transferred data passing to the host interface logic and to at least one of the host bus, the host computer, the host memory bus and the host memory.

22. The system as recited in claim 21, wherein the controller further comprises data verification logic connected to the first buffer circuitry, the second buffer circuitry and the multiplexing circuitry, wherein the data verification logic is configured to perform at least one data verification operation on data transferred between the first buffer circuitry and the second buffer circuitry without the transferred data passing to the host interface logic and at least one of the host bus, the host, the host memory bus and the host memory.

23. The system as recited in claim 21, wherein the controller further comprises a plurality of controllers, further comprising a bus switch connected to the host bus and having a plurality of controller interfaces for connecting to the plurality of controllers in such a way that the host interfaces with the plurality of controllers through the bus switch, and wherein a first controller of the plurality of controllers and at least one second controller of the plurality of controllers control the transfer of data therebetween without the transferred data passing through at least one of the host bus, the host, the host memory bus and the host memory.

24. The system as recited in claim 21, wherein the host includes control logic and/or software instructions for controlling the operation of the controller during the transfer of data from the first buffer circuitry to the at least one second buffer circuitry.

\* \* \* \* \*